(12) United States Patent
Ng et al.

(10) Patent No.: US 9,392,327 B2
(45) Date of Patent: Jul. 12, 2016

(54) BROADCAST/DIGITAL NETWORK SWITCHOVER SYSTEM AND METHOD

(75) Inventors: Sheau Bao Ng, Wayland, MA (US);
Glenn Reitmeier, Yardley, PA (US);
Rajan Mehta, Stamford, CT (US)

(73) Assignee: NBCUniversal Media, LLC, Wilmington, DE (US)

( * ) Notice: Subject to any disclaimer, the term of this patent is extended or adjusted under 35 U.S.C. 154(b) by 385 days.

(21) Appl. No.: 12/854,014

(22) Filed: Aug. 10, 2010

(65) Prior Publication Data

US 2012/0042349 A1    Feb. 16, 2012

(51) Int. Cl.
*H04N 21/442* (2011.01)
*H04N 21/414* (2011.01)
*H04N 21/438* (2011.01)
*H04N 21/462* (2011.01)
*H04N 21/61* (2011.01)

(52) U.S. Cl.
CPC ... *H04N 21/44209* (2013.01); *H04N 21/41407* (2013.01); *H04N 21/4383* (2013.01); *H04N 21/4622* (2013.01); *H04N 21/6112* (2013.01); *H04N 21/6131* (2013.01)

(58) Field of Classification Search
USPC .......................... 725/105, 109–110, 121, 131
See application file for complete search history.

(56) References Cited

U.S. PATENT DOCUMENTS

| | | | |
|---|---|---|---|
| 6,618,585 B1 * | 9/2003 | Robinson | 455/3.02 |
| 2006/0128420 A1 * | 6/2006 | van Rooyen | 455/552.1 |
| 2007/0138254 A1 * | 6/2007 | Frendo et al. | 235/375 |
| 2010/0257572 A1 * | 10/2010 | Sridhar et al. | 725/116 |

* cited by examiner

Primary Examiner — Mulugeta Mengesha
(74) Attorney, Agent, or Firm — Fletcher Yoder, P.C.

(57) ABSTRACT

A technique is provided for the parallel communication of digital content via broadcast channels and two-way data communications channels. Mobile devices may receive the digital content by the broadcast channels, and depending upon user preferences, signal quality, signal strength and other factors, coordinated switchover may be made from reception and playback of the content from a broadcast channel to reception and content from a two-way data communications channel.

28 Claims, 3 Drawing Sheets

BROADCAST/DIGITAL NETWORK SWITCHOVER SYSTEM AND METHOD

BACKGROUND OF THE INVENTION

The present invention relates generally to the field of digital content delivery, and more particularly to systems for broadcasting and receiving content in parallel to allow for a switchover between broadcast reception and two-way digital channel reception.

Rapid and considerable improvements have been made in recent years in the field of digital content delivery. A conventional mechanism for broadcast delivery of content included television broadcast in which signals are transmitted from broadcast towers and received on television receivers, set top boxes, and so forth. Similar systems have been put in place for cable and satellite transmission. Content transmitted by these mechanisms may include conventional television programming, movies, audio, video, multimedia and other entertainment content, business and surveillance content, and so forth. Increasingly, however, there is a desire to further advance the field through the ability to transmit and receive such content on mobile devices, such as mobile televisions, smart telephones, handheld devices, and so forth.

More recent developments in the mobile broadcast area have included standards developed and under development by such bodies as the Advanced Television Systems Committee (ATSC). The standards currently include mobile digital television (MDTV) standards designed to allow for devices to be truly mobile while receiving television broadcasts. In North America, such standards are being advanced still further by the establishment of ATSC mobile/handheld (ATSC-M/H) standards for handheld transportable devices. Other parallel standards are being established in other areas of the world.

Many such devices can and do receive streams of digital content by channels other than broadcast channels, however. In particular, many smart phones and mobile devices today communicate readily over the Internet to receive images and web pages, streaming audio, streaming video, multimedia, content, podcast, and so forth. In general, the ability to transmit content via broadcast channels is greatly preferred in many contexts. For example, standard broadcast schedules can be developed and content may be broadcast through established infrastructure with little or no change. Where desired, similar broadcasts can be transmitted to conventional receivers (stationary televisions) and to mobile devices. Moreover, Internet content, while extremely flexible in terms of time shifting and responsiveness to user requests, are often limited in bandwidth, with users often paying a premium for the reception of on-demand content from Internet sources. Current business models often channel these costs through the telephone or Internet service provider.

Although broadcast mechanisms may be preferred, they are often plagued by the unreliability of quality transmission, reception and playback. Such problems are often causes by inconsistent, shifting transmission quality, particularly due to atmospheric interferences, particularly for mobile devices that are actually moving during reception. Although advances will certainly occur, particularly through the further development of MDTV and similar standards, it is anticipated that for the foreseeable future difficulties will persist in the ability to reliably receive and playback digital content on mobile devices that is received by broadcast channels.

Moreover, certain broadcast techniques have been developed that are capable of handling some degradation in signal quality. One such technique, sometimes referred to as "stagercasting", allows for multiple streams of the same content to be broadcast that are staggered in time (e.g., time delayed with respect to one another), effectively accumulating buffer time. However, the same or similar channels are used in such approaches, ultimately resulting in increased the use of the available broadcast bandwidth, with little real resolution of the ability to receive content in an uninterrupted manner in the event of deteriorating signal quality.

There is a need, therefore, for improved mechanisms allowing users to make use of broadcast channels where available for receiving and playing back content on mobile devices, while relying upon the robust nature of Internet transmissions where the broadcast channels are lacking.

BRIEF DESCRIPTION OF THE INVENTION

The invention provides a novel approach to the transmission of digital content designed to respond to such needs. The invention may be used with a wide range of devices, but is particularly well-suited to mobile devices that can receive content by broadcast channels, and also through Internet or two-way data communications channels. In accordance with the first aspect of the invention, a method is provided for transmitting digital content to a receiver. The method includes broadcasting the content via a broadcast channel, and exchanging data with a receiver of the broadcasted content via a two-way data communications channel in parallel with the broadcast channel. The content is then transmitted to the receiver via the two-way data communications channel.

The invention also provides a method for transmitting digital content to a mobile receiver that comprises receiving the content from a broadcaster content via a broadcast channel and playing the content from the broadcast channel. Data is exchanged with a content provider via a two-way data communications channel in parallel with the broadcast channel. Based upon the exchanged data, the content is then received via the two-way data communications channel, and on the mobile receiver.

Variations of these methods, as well as systems are also offered by the invention.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
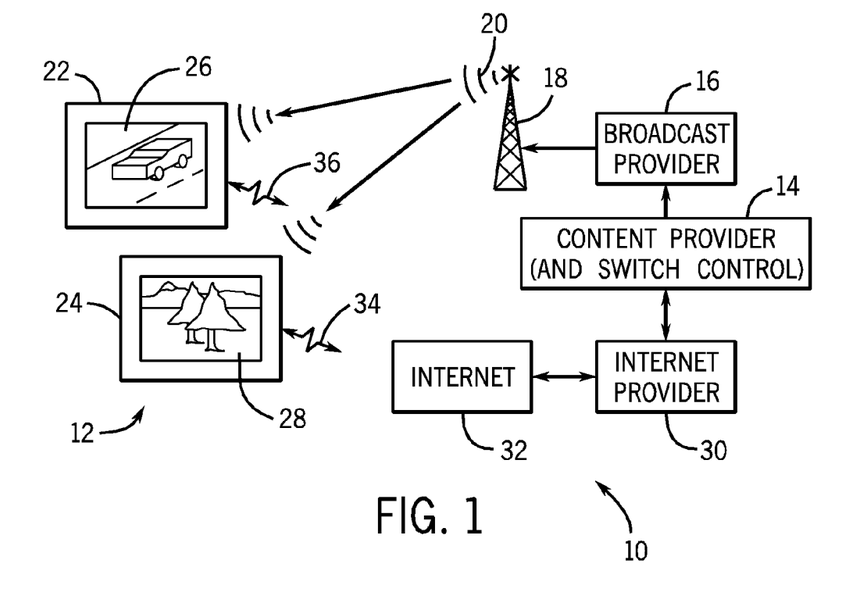
FIG. 1 is a diagrammatical representation of a digital content transmission and reception system incorporating aspects of the present techniques.

FIG. 1 is a diagrammatical representation of an exemplary system 10 for transmitting and receiving digital content via parallel channels. The system 10 is illustrated as serving a target audience 12 as discussed below. Digital content is provided by content provider 14 that may also control switching of reception by any one or more of the receivers of the target audience as also discussed below. In general, the content provider 14 may include any current broadcaster, content source, cable or satellite content provider, and so forth. Such content providers generally maintain and transmit, or receive and retransmit, content, such as television programming, movies, audio, video, multi-media, or other content that is of interest to the target audience. The content provider will typically establish a schedule for the broadcast transmission of specific content over one or more stations (e.g., user selectable or tunable "channels"). It should be noted that the term "channel" as used herein to refer to the broadcast channel or a portion thereof that carries a transmission, and to the two-way data communications channel is intended to refer to a signal pathway that may include one or, in most cases, many components, signal handling devices and signal transfer devices, as opposed to conventional television "channel" or stations. In the illustration of FIG. 1, then, the content provider 14 provides the content to a broadcast provider 16 which draws upon circuitry for encoding the content and broadcasting the content over the airwaves via an infrastructure, as illustrated by reference numeral 18. In practical contexts, the infrastructure may include existing processing circuitry, broadcast towers and antennas, but may also include cable networks, satellite distribution, and so forth. It should also be noted that in some actual implementations, the content provider and the broadcast provider may be the same entity.

The broadcast provider coordinates the emission of signals, which may be radiated over the airwaves as indicated by reference numeral 20. The broadcast stream 20 is transmitted to any and all receivers that are within range and capable of receiving and decoding the signals. In many implementations the infrastructure 18 will include a range of transmission towers or devices spread over a large geographical area, and scheduling of the content broadcasts may be adapted for particular audiences, particular geographic regions, particular time zones, and the like. The target audience, then, receives the broadcast data stream 20 via receivers as indicated by reference numerals 22 and 24. In the present context these are mobile receivers that are equipped in accordance with existing and future standards, particularly standards for MDTV, and analogous standards in different locations around the world. The receivers may be any suitable devices so equipped, such as smart telephones, handheld and laptop computers, mobile telephones, tablet computing devices, and so forth.

The circuitry within such devices may be generally conventional, and will include one or more processors, supporting memory circuits, power supplies, and so forth. The devices will also include display drivers and audio playback drivers along with their associated displays and speakers for playing back the content in a conventional manner. In the embodiment illustrated in FIG. 1, content is being displayed on displays 26 and 28 of the mobile devices 22 and 24, respectively. It should be noted that the content need not be the same on both devices, as the devices may have tuned in to different program data streams being broadcast by a single broadcast provider or different broadcast providers. In a practical implementation, a number of business models may be contemplated in which the receivers pay a subscription fee for particular content through a content provider, such as is currently the case for cable or satellite television. Such business models may also include the channeling of such costs through a telephone or Internet service provider.

The mobile receivers 22 and 24 are also equipped to communicate via two-way data communications channels. In the implementation of FIG. 1, the content provider 14 may also communicate content via such channels. As illustrated, this may occur through an Internet provider 30 which will typically be equipped to receive the content from the content provider 14, package the content or a portion thereof (e.g., video only or audio only), and transmit the content via servers in a conventional manner and in accordance with conventional protocols (e.g., TCP/IP). The content provider 30 will thus distribute the content via the Internet 32, or any other network, such as a local area network, wide area network, virtual private network, or any other suitable two-way data communications network. In general, however, it will be practical for such implementations to be capable of transmitting at least some of the data via the Internet. In many contexts, the two-way data communications channels may also include cellular networks, wireless local area networks, $3^{rd}$, $4^{th}$ and later generation international mobile communications networks, and so forth. The receivers 22 and 24 may thus transmit received data via links as indicated by reference numerals 34 and 36. These links may be wired, but in many implementations they will be wireless, such that the communication passes through a wireless local area network, or the like.

As described more fully below, the system of FIG. 1 allows for the parallel broadcast and transmission of digital content through broadcast channels and through two-way data communications channels. Because the broadcast scenario is highly efficient and powerful for providing the content to a wide audience, the broadcast channel will typically be preferred. However, because the receivers may have difficulty receiving information through the broadcast channels or because issues such as signal strength, image quality and so forth may be degraded by poor reception, the system is designed to allow for a seamless switching reception from the broadcast channel to the two-way data communications channel.

It should be noted that, while the present techniques are particularly well suited to use with mobile devices, they may also be used in many situations in which switching between conventional broadcast content and parallel two-way data communications (e.g., Internet) transmission are possible. For example, televisions and set-top boxes may be configured to receive broadcast, satellite or cable television programming, as well as network data. In certain circumstances, a broadcaster may desire to switch a portion of the audience to particular data streams transmitted via the parallel two-way data communications channels, such as for local or targeted advertising rather then advertising transmitted in a regular broadcast stream. In other situations, quite similar to those that may be encountered by mobile devices, signal quality issues may make the two-way data communications more attractive, such as during inclement weather when satellite or conventional television reception is poor.

Figure 2:
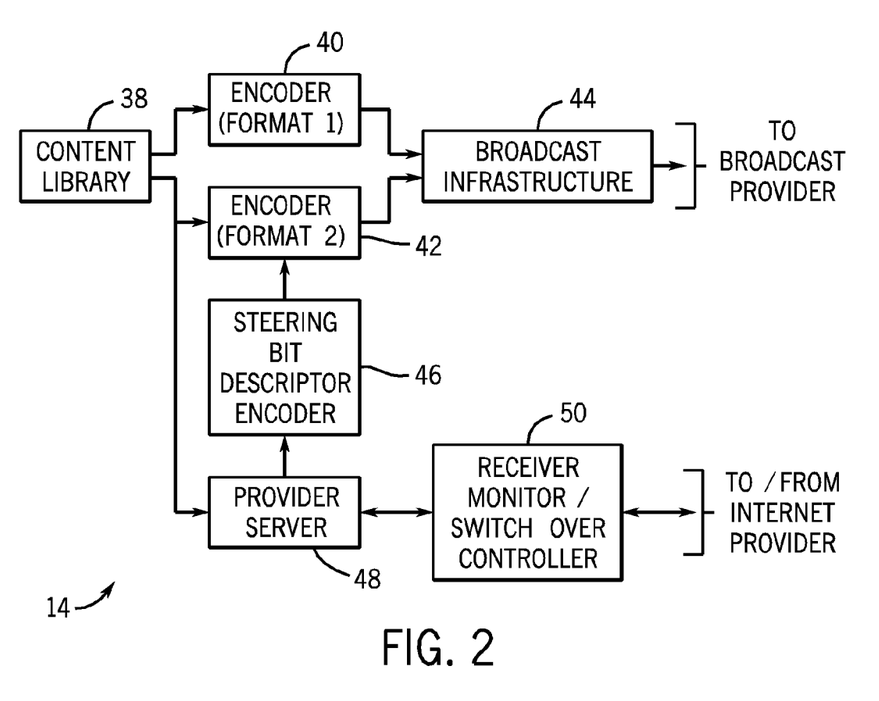
FIG. 2 is a diagrammatical representation of certain functional elements of the content provider adapted for use in the system of FIG. 1.

FIG. 2 is a diagrammatical representation of some of the functional elements that may be included in the content provider 14 discussed above. As mentioned above, the content provider will typically draw upon a library of content as indicated by reference numeral 38. Such content may be digitized and stored in the library, and may include a wide range of digitized legacy content, such as television programming, movies, music, and so forth. New content may be added to the library at any time and this content, too, may be offered for viewing in accordance with currently established broadcast scheduling techniques. The content provider may draw such content from the library and encode the content for broadcast as indicated by reference numeral 40. Such encoding may be performed to transmit the content in accordance with any suitable format and in accordance with various broadcast standards. The encoder 40 is adapted to send the content via airwaves, for example, to conventional stationary receivers (e.g., televisions). The same content may also be encoded in different formats as indicated by encoder 42. In a presently contemplated embodiment, for example, encoder 42 encodes content for transmission in accordance with mobile digital television standards. The content may be the same and transmitted in parallel with the content transmitted by encoder 40 or different content may be sent to mobile devices in accordance with a separate schedule. In practice, many such streams of content may be sent in parallel with the user being able to tune or select a stream as desired. Streams from both encoders are transmitted to the broadcast infrastructure as indicated by reference numeral 44. Again, such broadcast infrastructure may include circuitry for amplifying the streams, conditioning the streams, and eventually for broadcasting the streams over the airwaves.

In addition to encoding the basic content, encoder 42 may place data in the transmitted content stream that allows for coordination of switching options between the provision of content via the broadcast channel and the provision of the same content via two-way data communications channels (e.g., including the Internet). In the embodiment illustrated in FIG. 2, for example, a steering bit descriptor encoder 46 is provided for defining and implementing a steering bit descriptor in the broadcast data stream. Details of the descriptor are provided below. In general, however, the descriptor allows for receivers of the mobile receivers of the content via the broadcast channel to identify sources of the same content via the two-way data communications channels, and, when desired, to switch from reception and playback of the content from the broadcast channel to reception and playback of the content via the two-way data communications channel. The descriptor encoder 46 will typically be linked to a provider server 48 which can provide details of receiver identifications, source locators (e.g., universal resource locators, or URL's) and so forth. The provider server also may receive the content that is encoded by the encoder 42 and may output the content for further transmission via the two-way data communications channel. In the illustrated embodiment, the server 48 communicates with a receiver monitor/switchover controller 50 that can determine whether one or more receivers should switch from receiving and playing back content from the broadcast channel to receiving and playing back content from the two-way data communications channel. The receiver monitor/switchover controller 50, then, exchanges signals and data with the Internet provider discussed above with reference with FIG. 1. In general, the server 48 and the controller 50 may be embodied in one or more appropriately programmed computers, but may also include specialized firmware, software, and even hardware. The server allows for defining the bit descriptor for the encoder 46, as well as for encoding and packetizing the digital content in a conventional manner. The controller 50, on the other hand, is capable of monitoring certain conditions of the receivers, monitoring signals communicated back from the receivers, and coordinating switching over of the transmission and reception where desired or needed. In some implementations, the server 48 and controller 50 may be embodied in the same physical device. Moreover, in many implementations, many such servers and controllers may be provided and used in parallel, both at a single location and at locations distributed over a wide geographical area serving multiple audiences.

It should be noted, that as used herein "content" should be understood to mean a consistent thematic presentation intended for a human audience. Examples of "content" include television programs, movies, documentaries, video frames (e.g., slide shows), visual and textual documents, music, and so forth. In many cases, such content will include a video portion and an audio portion. In such cases, transmission and reception of one or both components may be branched to a two-way data communications channel as summarized below. Moreover, the content transmitted to the receiver via the two-way data communications channel may have different parameters than the content broadcasted via the broadcast channel (although the audience would still recognize the "content" as consistent. For example, in the case of video content, different qualities may be transmitted, such qualities consisting of such parameters as format, resolution, frame rate, compressed bit rate, encoding parameters.

Figure 3:
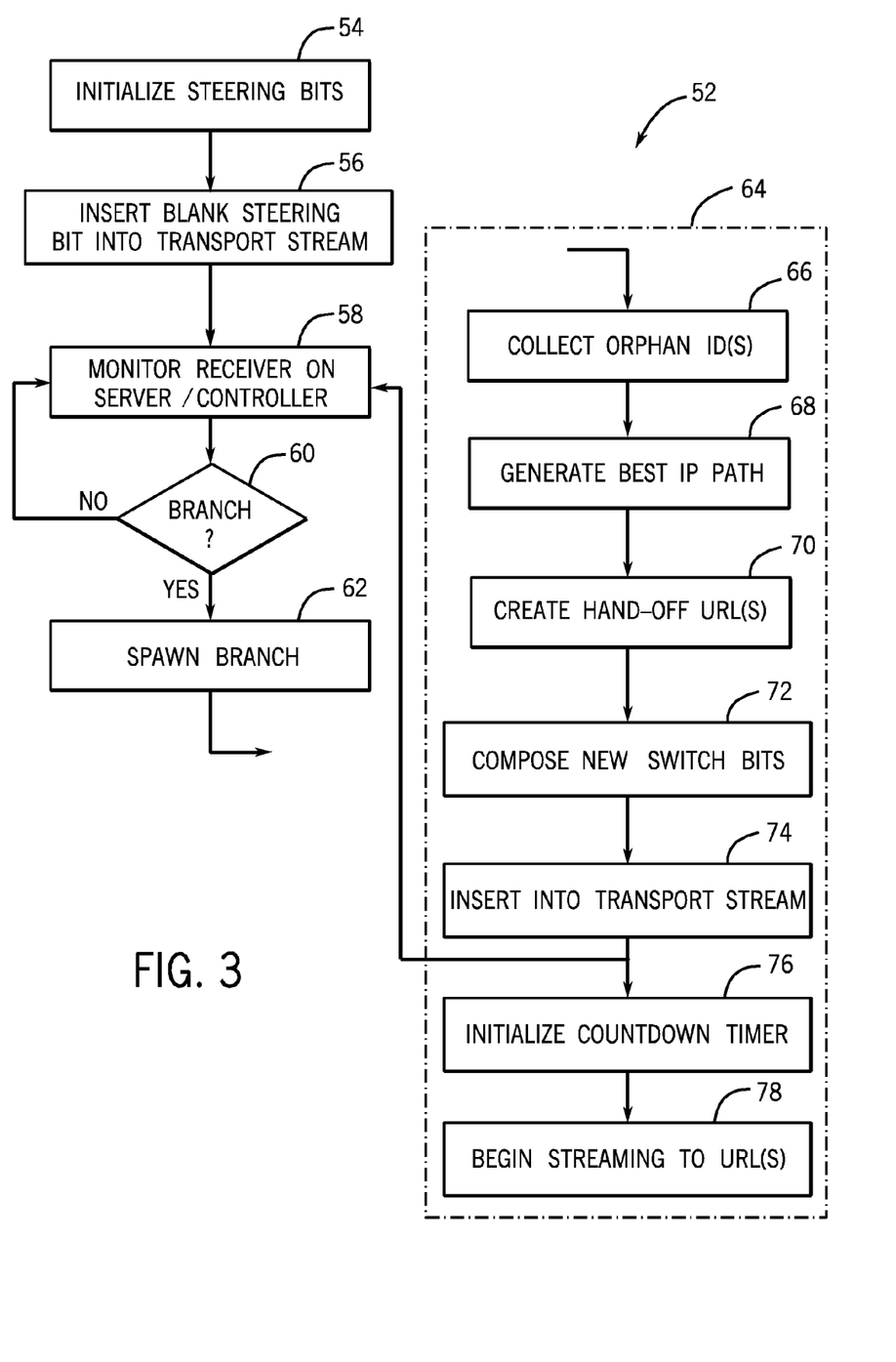
FIG. 3 is a flow chart illustrating exemplary logic for coordinating, from a transmitter side, the branching or switchover from broadcast channel reception to two-way data communications channel reception.
Figure 4:
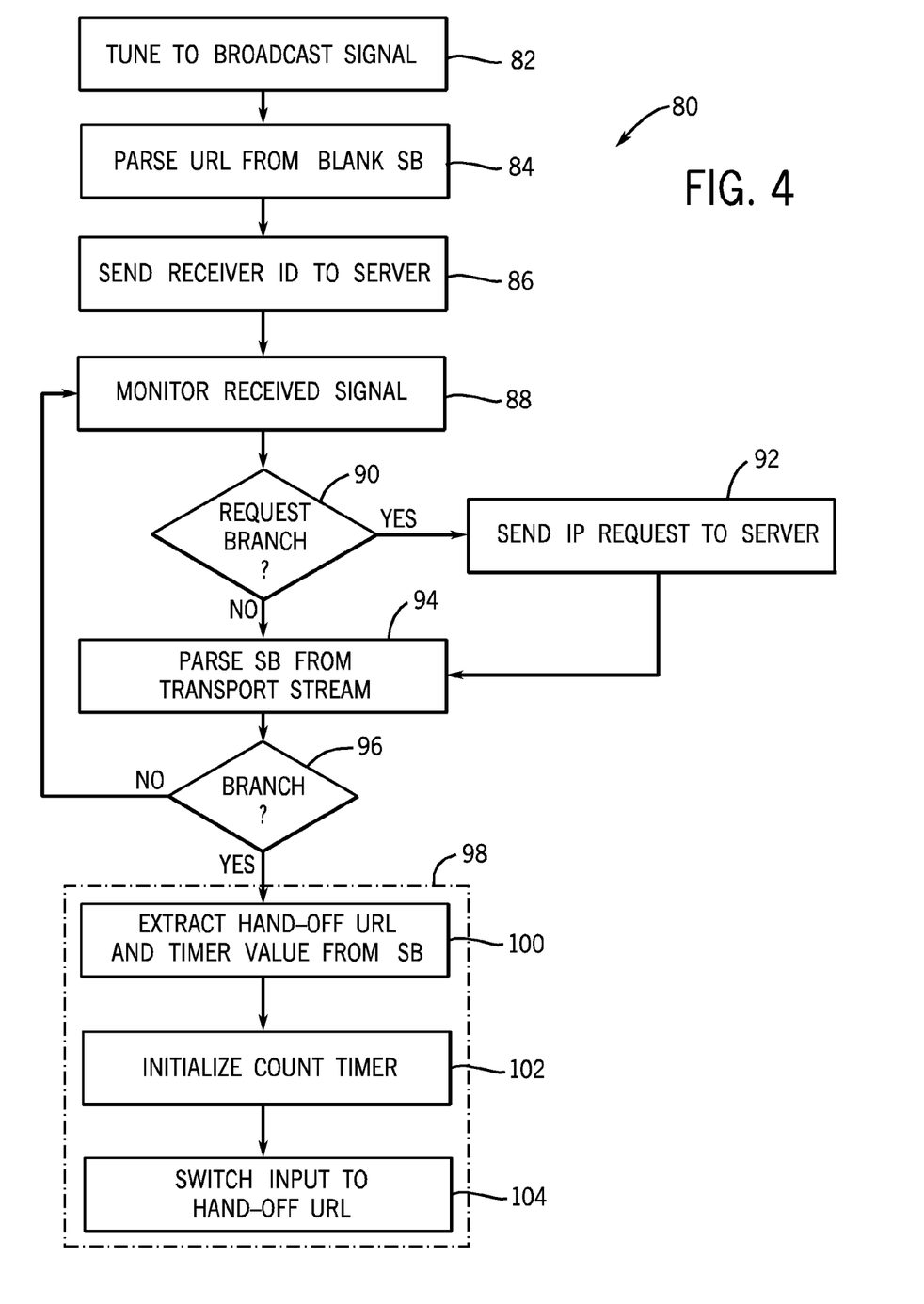
FIG. 4 is a flow chart illustrating exemplary logic for performing such branching or switchover from a receiver side.

Exemplary logic for transmitting the digital content via the broadcast channel and in parallel via the two-way data communications channel is illustrated in FIGS. 3 and 4, with FIG. 3 illustrating the logic from a transmitter side, while FIG. 4 illustrates exemplary logic from a receiver side. The logic is based upon the ability to transmit what is, in the present context, termed "steering bits". These are strings of data which encode specific information needed for a receiver to check in with a content provider, and to receive instructions for switching from broadcast channel reception and playback to two-way data communications channel reception and playback when desired. The current ATSC-M/H standard, for example, allows for the definition of a number of descriptors, and in a present context the steering bits have been designed to correspond to one such descriptor. In particular, the table below illustrates exemplary syntax for the steering bit descriptor:

| Bit Syntax for Steering Bit Descriptor | | |
|---|---|---|
| Syntax | no. of bits | format |
| Steering_bit_descriptor( ) { | | |
|    descriptor_tag | 8 | 0xTBD |
|    descriptor_length | 8 | uimsbf |
|    home_URL( ) { | | |
|       URL_length | 8 | uimsbf |
|       URL( ) | var | |
|    } | | |
|    num_orphan_receivers | 8 | uimsbf |
|    for (i=0; i<num_orphan_receivers; i++) { | | |
|       receiver_ID | 8 | uimsbf |
|       receiver_IP_addr_length | 8 | uimsbf |
|       receiver_IP_addr( ) | var | |
|       switch_Time | 8 | uimsbf |
|       hand_off_url_length | 8 | uimsbf |
|       hand_off_URL( ) | var | |
|    } | | |
|    for (j=0; j<N; J++) { | | |
|       reserved | 8 | bslbf |
|    } | | |
| } | | |

It should be noted that such data, whether in the form of this descriptor or otherwise, may be transmitted in various locations in a broadcast stream, such as in a signaling and announcement layer, an electronic service guide, or user data. In general, the data will include an indication of a network resource, such as a website, at which the receiver may perform a "handshake" and from which the receiver may obtain information on where to draw content in the event of a switch from the broadcast stream. It should also be noted that the data transmitted in the steering bits will typically be dynamic insomuch as it may be based in part on data from the receivers tuned to the broadcast stream.

The bit stream syntax for the steering bit descriptor includes, in the present embodiment, information capable of conveying the descriptor tag, the descriptor and the descriptor length. Information may also be conveyed that indicates the Internet protocol (IP) address or URL for the site at which the mobile device may check in to provide two-way data communications. That is, the mobile device will be configured to address, in parallel with the broadcast reception, data to a URL provided in the steering bit data (such data could be in any form, including electronic messages and mail, and so forth). As discussed below, data exchange in this manner may allow for evaluation of reception quality, signal quality, playback quality, and may coordinate the switching from playback from the broadcast channel to playback from the two-way data communications channel. The steering bit descriptor also allows for an indication of the number of "orphan" receivers, as well as certain information directed specifically to these receivers. In the present context, the term "orphan" receivers indicates those receivers which are or will be switched from the playback of content from the broadcast channel to playback of the content from the two-way data communications channel. Accordingly, the steering bit descriptor allows for identification of the receiver, the receiver IP address, a particular switch time for coordinating the seamless switchover, and a hand-off URL to which the receiver will tune for receipt of the content. Other or different descriptors may, of course, be used, including ATSC-compliant descriptors and descriptors not complying with ATSC standards. Such descriptors may provide the same information discussed herein, or additional or different information, but will typically provide a resource location at which the receiver can obtain information or content that is the same as or in some way complements the content received via the broadcast channel. It should be noted that, although the "handshake" data may be exchanged between the receiver and the same network resource from which the receiver will obtain the content, in many cases, it may be desirable that the data is exchanged with the receiver via a first network resource, and the content is transmitted to the receiver via the two-way data communications channel from a second network resource.

The logic implemented by the transmitter, as indicated by reference numeral 52 in FIG. 3, will then begin with initializing the steering bits as indicated by reference numeral 54. The initialization may allow for encoding of a blank steering bit, or the steering bit may include certain information that may be acted upon initially, such as the home address, e.g., URL discussed above. As noted above, the steering bit will be embedded in the broadcast data stream as indicated by reference numeral 56 and the data stream may be broadcast and received by one or more receivers.

As indicated by reference numeral 58, the content provider then monitors receivers via the server/controller discussed above with reference to FIG. 2. In particular, the receivers may be programmed to send information via the two-way data communications channel that indicates whether the receiver desires to switch from reception and playback of the broadcast content to reception playback of the two-way data communications content, but data may also include such parameters as signal quality, signal strength, broadcast channel interference, channel data error rate, and so forth. Based upon such data, the content provider may then determine whether a branch or switchover in streams as desired as indicated by reference numeral 60. If no changes desired are necessary, the provider continues to monitor receiver data as indicated by reference numeral 58. Note that the current invention provides for cases where the content provider may choose to signal a switch for a particular set of receivers for reasons other than direct request or feedback from the said receivers. For example, a broadcaster may prefer to switch certain receivers to the two-way data communications channel for particular advertisements, commercials, and so forth, other than those disseminated via the broadcast channel. In the event that a change is desired or warranted, however, a branch is spawned as indicated by reference numeral 62. Reference numeral 64, then, represents exemplary logic that may be implemented in such spawned switchovers.

At the step 66 the provider may collect the identifications of the one or more receivers that are to be switched from reception and playback of the broadcast stream data to reception and playback of the two-way data communications stream data. This will typically be performed by reference to the data exchanged via the Internet in the same way as step 58 received data. That is, the receiver or receivers to be switched will have communicated the data via the home URL transmitted at step 56.

At step 68, then, a network path may be determined that will be used for the transmission of the content via the two-way data communications channels. At step 70, based upon this path, one or more hand-off URLs is determined. In the present embodiment, a first URL is used for the content provider's server for exchanging data prior to such branching, while one or more secondary URLs is used for the actual transmission of the content. At step 72, then, new switch bits are established in accordance with the syntax discussed above. Although this syntax is but one of many possibilities, in the present context the syntax allows for designation of receiver IP addresses, switch times, and the hand-off URLs to be used in the switchover. These switch bits are then conveyed to all receivers in the broadcast content transport stream as indicated at step 74. Following transmission of new switch bits, the content provider may continue to monitor data from the receivers as indicated at step 58. That is, other receivers may, from time to time, require similar branching, and the content provider is able to similarly coordinate the switchover by those receivers.

Once the switch bits have been transmitted, the receivers will begin process of switching from reception and playback of the broadcast content to reception and playback of the content from the two-way data communications channel. Such processing is detailed below. Continuing in FIG. 3, however, the content provider will initialize a countdown timer as indicated at step 76 to allow for seamless coordination of the transition, reception and playback of the content. This counter will be based upon the switch time indicated in the new switch bits, such as in accordance with the descriptor mentioned above. At step 78, then, once the countdown timer has reached the target time, the provider begins streaming of the content to the one or more URLs indicated at step 70.

Coordinated logic is performed by the receivers as indicated in FIG. 4. In a presently contemplated embodiment, code defining the exemplary logic 80 is stored within the mobile devices and is executed when broadcast content is to be viewed. It may be noted that certain mobile devices may tune to certain content forces that are not equipped to carry out this logic, and such sources may simply make content available by broadcast means without the two-way data communications channel backup provided by the present techniques. In fact, the same mobile receiver may implement the logic of FIG. 4 when a broadcaster is capable of performing its transmitter-side logic, and may not implement the logic when the broadcaster simply outputs broadcast signals for reception.

The logic of FIG. 4 begins with step 82 in which the receiver tunes to the broadcast signal. Again, this step may be in conformance with established and future mobile television standards, such as those developed by the ATSC. At step 84, the blank or initial steering bit is parsed to determine the home URL for the broadcaster. Based upon this locator information, then, the mobile device, in parallel with reception and playback of the broadcast transmission connects via the two-way data communications channel (e.g., including the Internet) to the broadcaster home network address. The receiver then sends the receiver ID to the broadcaster server as indicated by reference numeral 86.

Various monitoring functions may then be performed as indicated by reference numeral 88. That is, switchover from reception and playback via broadcast transmission to reception and playback via two-way data communications transmission may occur for many reasons, including signal strength, signal quality, playback quality, and so forth as mentioned above. In the present implementation, then, at step 88 the receiver monitors such signals and, as indicated at step 90 may request a branch or switchover to reception via the two-way data communications channel. In a presently contemplated implementation, the switchover is essentially seamless and may not even be perceptible to the user of the mobile device. Moreover, in this implementation the user need not intervene in any way for the switchover to occur. However, the device itself or the user may request a switchover as indicated at step 90. Where such a branch is requested, then, the device may send a request to the server as indicated at step 92. As discussed above with reference to FIG. 3, when the provider receives such signals, a branch is spawned and the process begins for the switchover. After such information is sent to the server, or if no branch is requested at step 90, the receiver parses the current steering bit from the transport stream to determine whether its particular IP address has been referenced for a switchover. At step 96, then, the receiver determines whether such switchover instructions have been received by parsing of the current steering bit. If no such instructions have been received, the logic returns to continue to monitor signals as indicated at step 88.

Once a determination has been made that the particular address of the individual receiver has been referenced in a recent steering bit, as indicated by reference numerals 94 and 96, branching logic 98 may be performed which essentially mirrors the logic 64 of FIG. 3. The logic may begin with step 100 at which the receiver extracts the hand-off URL information and the timer value from the recent steering bit. As indicated above in FIG. 3 with reference to steps 70 and 74, and as indicated in the exemplary steering bit descriptor discussed above, the steering bit may include indication of a specific URL or other locator information to which the receiver should direct communications for receiving the desired digital content. The steering bit descriptor may also allow for coordination of timing for the switchover. This timing is then initiated at step 102, in a manner coordinated with the timing initiated in step 76 of FIG. 3 on the part of the transmitter. Once the timer has timed out, then, the receiver switches from receiving and playing back the digital content from the broadcast channel to receiving and playing back the same content from the two-way data communications channel. Again, the switchover is ideally seamless and little or no perceptible change will take place from the point of view of the user of the mobile device.

In addition to the processing described above, in certain embodiments, it may be desired to provide for user-override of the branching or switchover functionality, or for notice to the user that such changes will occur or are suggested. For example, depending upon the business model implemented, the user may be able to receive unlimited broadcasted content, such as on the basis of a subscription agreement, but may be limited in the amount of digital content that can be downloaded or otherwise received. In such cases, the user may wish to disable, at least temporarily, the ability to switchover from broadcast channels to two-way digital communications channels, or to be informed or authorize such changes when made or prior to switching.

Moreover, while the foregoing discussion focused primarily on switching from more favored broadcast channel reception to two-way digital communications channel reception, the system and methodology may be adapted to switch back when desired. In general, this could be based upon continued monitoring of the signal quality, signal strength, and so forth. It may be preferred, moreover, to permit switching back to the broadcast channel reception and playback only after a set time, to avoid "hunting" or frequent hopping between the two.

Still further, it is contemplated that a number of other functions may be performed based upon the switch bit implementation. For example, target audiences may be monitored to evaluate interest in particular programming, demographic habits, and so forth. Similarly, the switch bit descriptor, and data exchanged with particular identifiable target audiences (or even individuals) may be used for targeted advertising, special offers, and so forth. The receiver may also transmit to the broadcaster (or more generally to the network resource) data indicative of its location, such as to allow for audience measurements, coordinated branching, and so forth. In this sense, the tuning process may be considered to begin a "session" from the time the receiver reports back to the network resource, with various operations being available based upon the two-way data communications link.

It should also be noted that, although the branching described above may be coordinated in time and for specific receivers, in some contexts and applications similar branching may be made that is somewhat independent of time or even of receivers. That is, the hand-off addresses and resources discussed above are useful for timed entry of the designated receivers into reception and playback from the two-way data communications channel. However, in some contexts the same content may simply be broadcast and transmitted in parallel, such that at any particular time, the receiver may switch from broadcast reception and playback to the parallel two-way digital stream. In some cases, this may even be performed with little or no interaction with the broadcaster, other than receiving via the steering bits an indication of the address of the parallel transmission resource (e.g., URL). In this sense, the present techniques may allow for transmitter-steered branching, receiver-initiated branching, and various hybrids of the two.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for transmitting digital content to a receiver comprising:

broadcasting, first data via a broadcast channel, wherein the first data includes steering data, the steering data including a designation of a network resource accessible to the receiver via a two-way data communications channel;

transmitting second data to the receiver via the network resource over the two-way data communications channel in parallel with the first data via the broadcast channel; and wherein the steering data provides instructions with an indication that the receiver should initiate switch over from receiving a portion of the digital content from the broadcast channel to receiving a portion of the digital content from the two-way data communications channel at a particular point.

2. The method of claim 1, wherein the digital content includes a video portion and an audio portion, and wherein one of the video and audio portions is transmitted to the receiver via the two-way data communications channel.

3. The method of claim 1, wherein the digital content transmitted to the receiver via the two-way data communications channel has a different video quality than the content broadcasted via the broadcast channel.

4. The method of claim 3, wherein the different video quality comprises at least one of format, resolution, frame rate, compressed bit rate, encoding parameters.

5. The method of claim 1, wherein the data is exchanged with the receiver via a first network resource, and the wherein an additional portion of the digital content is transmitted to the receiver via the two-way data communications channel from a second network resource.

6. The method of claim 1, wherein the steering data comprises data identifying the receiver.

7. The method of claim 1, wherein the network resource comprises an Internet site.

8. The method of claim 1, wherein the digital content is broadcast via the broadcast channel and transmitted via the two-way data communications channel simultaneously.

9. The method of claim 1, wherein data representative of reception quality is communicated between the receiver and the network resource over the two-way data communications channel.

10. A method for transmitting digital content on a receiver comprising:

receiving the digital content from a broadcaster via a broadcast channel;

receiving steering data via the broadcast channel, the steering data including a designation of a network resource accessible to the receiver via a two-way data communications channel;

playing the digital content from the broadcast channel;

exchanging data via the network resource with a content provider over the two-way data communications channel;

receiving at least a portion of the digital content via the two-way data communications channel; and playing the digital content from the two-way data communications channel based upon indication information provided in the steering data, wherein the indication information is configured to indicate the portion of the digital content to be played from the two-way data communications channel at a particular point for coordinating transition from the broadcast channel to the two-way data communications channel.

11. The method of claim 10, wherein the data is exchanged with a first network resource, and the digital content is received via the two-way data communications channel from a second network resource.

12. The method of claim 10, wherein the steering data comprises data identifying the receiver.

13. The method of claim 10, wherein the content is broadcast via the broadcast channel and transmitted via the two-way data communications channel simultaneously.

14. The method of claim 10, wherein a switch between playing from the broadcast channel and playing from the two-way data communications channel is performed without intervention by a viewer of the digital content on the receiver.

15. The method of claim 10, wherein the data exchanged with the content provider includes data representative of reception quality.

16. The method of claim 10, wherein the receiver comprises a mobile receiver.

17. A system for transmitting digital content to a receiver comprising:

means for broadcasting the digital content via a broadcast channel, wherein the broadcast includes steering data, the steering data comprising a designation of a network resource accessible to a receiver via a two-way data communications channel and switch over indication data configured to indicate at least a portion of the digital content to be transmitted via network resource over the two-way data communications channel and a particular switch time for coordinating transition from the broadcast channel to the two-way data communications channel;

means for exchanging data via the network resource with a receiver of the broadcasted digital content over the two-way data communications channel in parallel with the broadcast channel; and means for transmitting the at least a portion of the digital content to the receiver via the two-way data communications channel based upon the switch over indication data.

18. The system of claim 17, wherein the network resource comprises an Internet site.

19. The system of claim 17, wherein the steering data comprises data identifying the receiver.

20. A system for transmitting digital content on a receiver comprising:

means for receiving the digital content from a broadcaster via a broadcast channel;

means for receiving steering data via the broadcast channel, the steering data comprising a designation of a network resource accessible to the receiver via a two-way data communications channel and switch over indication data configured to indicate at least a portion of the content to be transmitted via network resource over the two-way data communications channel and a particular switch time for coordinating transition from the broadcast channel to the two-way data communications channel;

means for playing the digital content from the broadcast channel;

means for exchanging data via the network resource with a content provider over the two-way data communications channel;

means for receiving at least a portion of the digital content via the two-way data communications channel; and means for playing the digital content from the two-way data communications channel based upon the switch over indication data.

21. A method for transmitting digital content to a receiver comprising:

broadcasting the digital content via a broadcast channel;

broadcasting steering bits via the broadcast channel, the steering bits comprising address data for directing receivers of the broadcast digital content to at least one network resource configured to exchange data with the receivers via a two-way data communications channel in parallel with the broadcast channel and switch over indication data configured to indicate at least a portion of the digital content to be transmitted via network resource over the two-way data communications channel and a particular switch time for coordinating transition from the broadcast channel to the two-way data communications channel.

22. The method of claim 21, comprising transmitting the same digital content via the two-way data communications channel substantially time synchronized with the broadcast of the digital content via the broadcast channel.

23. A non-transitory machine readable medium comprising code stored on at least one memory device for:
broadcasting content via a broadcast channel, wherein the broadcast includes steering data, the steering data comprising a designation of a network resource accessible to a receiver via a two-way data communications channel and switch over indication data configured to indicate at least a portion of the content to be transmitted via network resource over the two-way data communications channel and a particular switch time for coordinating transition from the broadcast channel to the two-way data communications channel;
exchanging data via the network resource with a receiver of the broadcasted content over the two-way data communications channel in parallel with the broadcast of the content via the broadcast channel; and
transmitting at least a portion of the content to the receiver via the two-way data communications channel based upon the switch over indication data.

24. A non-transitory machine readable medium comprising code stored on at least one memory device for:
receiving content from a broadcaster via a broadcast channel; receiving steering data via the broadcast channel, the steering data comprising a designation of a network resource accessible to the receiver via a two-way data communications channel and switch over indication data configured to indicate at least a portion of the content to be transmitted via network resource over the two-way data communications channel and a particular switch time for coordinating transition from the broadcast channel to the two-way data communications channel;
playing the content from the broadcast channel;
exchanging data via the network resource with a content provider over the two-way data communications channel;
receiving the at least a portion of the content via the two-way data communications channel; and
playing the at least a portion of the content from the two-way data communications channel based upon the switch over indication data.

25. The method of claim 1, wherein the steering data includes instructions for initializing a countdown timer for transitioning from the broadcast channel to the two-way data communications channel and then transitioning back within a set timeframe.

26. The method of claim 1, comprising including the steering data in the first data based on a preference for providing advertisements or localized information via the two-way data communication channel.

27. The method of claim 10, wherein the indication information comprises instructions for transitioning from the broadcast channel to the two-way data communications channel based on a countdown timer.

28. The method of claim 10, wherein the steering data transitions from the broadcast channel to the two-way data communications channel to provide advertisements or localized information.

* * * * *